United States Patent [19]

Penora

[11] Patent Number: 4,801,199
[45] Date of Patent: Jan. 31, 1989

[54] TEMPLE ADAPTER

[76] Inventor: Sal J. Penora, 920 1st Ave., Franklin Square, N.Y. 11010

[21] Appl. No.: 82,381

[22] Filed: Aug. 6, 1987

Related U.S. Application Data

[63] Continuation-in-part of Ser. No. 824,587, Jan. 3, 1986, abandoned.

[51] Int. Cl.<sup>4</sup> .............................................. G02C 5/22
[52] U.S. Cl. ..................... 351/111; 16/228; 351/121
[58] Field of Search ............... 351/111, 116, 121, 144, 351/152–153, 178; 29/20, 402.04, 402.13, 402.16; 264/249; 16/228

[56] References Cited

U.S. PATENT DOCUMENTS

| 1,173,151 | 2/1916 | Durbin et al. | 351/152 |
| 1,996,683 | 4/1935 | Pappert | 351/121 |
| 2,456,293 | 12/1948 | Markell | 351/152 |
| 2,829,558 | 4/1958 | Ratti | 16/228 |
| 2,947,024 | 8/1960 | Czudak, Jr. | 16/228 |
| 3,189,912 | 6/1965 | Miller | 16/228 |

FOREIGN PATENT DOCUMENTS

| 137025 | 8/1979 | German Democratic Rep. | 351/121 |
| 288748 | 9/1931 | Italy | 351/153 |
| 767345 | 1/1957 | United Kingdom | 351/121 |

*Primary Examiner*—John K. Corbin
*Assistant Examiner*—Martin Lerner
*Attorney, Agent, or Firm*—Leonard Belkin

[57] ABSTRACT

A temple adapter for use with eye glass frames to facilitate the replacement of a damaged or broken temple on the eye glass frames. The adapter is a U-shaped member which is cemented in place on the frame and the replacement temple is soldered to that member. The U-shaped member is of metal construction, thick enough to provide adequate support for the temple and thin enough to permit it to be bent to conform to the shape of the frame where it is to be placed.

3 Claims, 1 Drawing Sheet

U.S. Patent   Jan. 31, 1989   4,801,199
FIG. 1
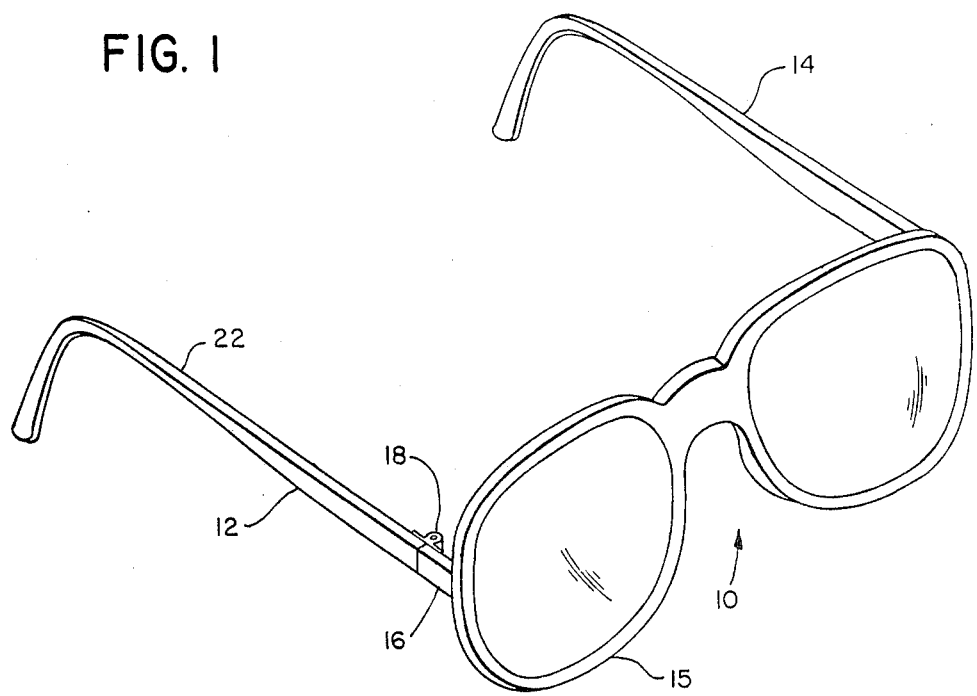
FIG. 2
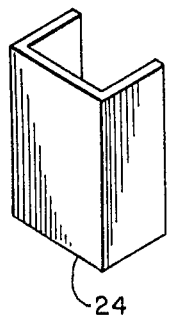
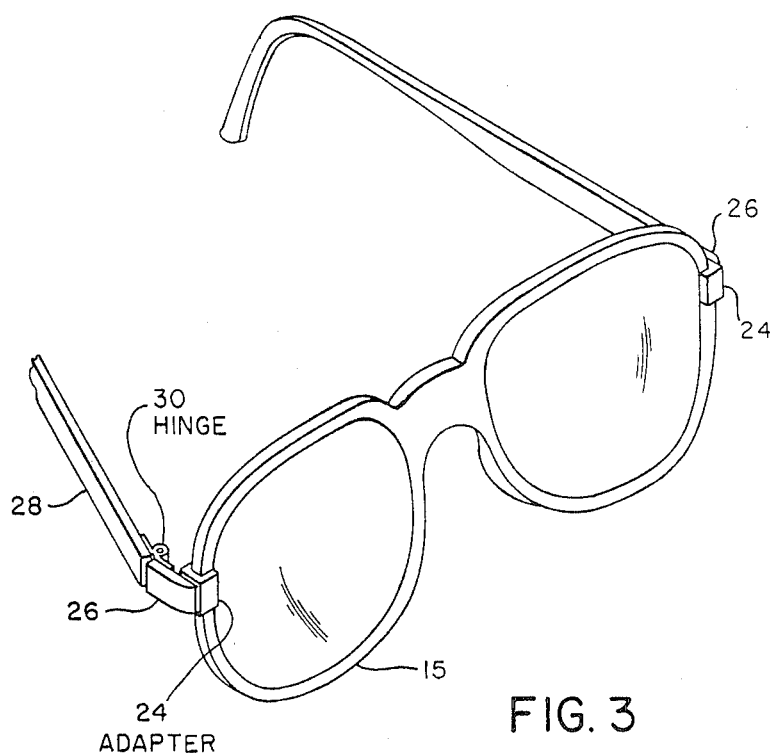
FIG. 3

TEMPLE ADAPTER

BACKGROUND OF THE INVENTION

This application is a continuation-in-part of my application Ser. No. 824,587 filed on Jan. 3, 1986 now abandoned.

The present invention relates to a temple adapter and more particularly to apparatus which is connected to an eye glass frame to permit the replacement of the original temple which may have been damaged or broken and consequently has become unusable.

Ordinarily, when the temple on an eye glass frame is damaged or becomes broken, it is necessary to replace the entire frame. Since eye glass frames are costly items, it would be desirable if there were available a simple and economic arrangement for replacing the damaged temple.

At the present time there is no such apparatus available which the eye glass user himself can resort to in order to replace his damaged or broken temple. His only alternative is to either have a professional technician repair the frame usually at a substantial cost, or obtain new frames, also at great cost.

SUMMARY OF THE INVENTION

In this invention I provide an arrangement and method for the wearer of eye glasses to replace a damaged or broken temple simply and in a manner which results in the replacement being adequately ornamental as well as useful and dependable.

In accordance with a preferred embodiment of this invention there is provided in combination with an eye glass frame, a temple adapter for replacing the original connection of the original temple on the frame comprising a U-shaped member overlapping the frame and cemented thereto, an attachment on the outside of said member for supporting a hinge, and a replacement sidepiece connected to said hinge.

In accordance with another embodiment of this invention, there is provided method of repairing an eye glass frame in which a temple is damaged or broken comprising the steps of mounting on said frame over the original connection for the original frame a U-shaped member, cementing said member to said frame, and welding or soldering a temple adapter to the outside of said member, said adapter comprising a holder for a hinge to which one end of a replacement sidepiece is attached.

It is therefore a principal object of this invention to provide apparatus and method for the replacement of a damaged or broken temple on eye glasses rather than replacing the eye glass frame.

Other objects and advantages of this invention will become obvious from the following description of preferred embodiments of this invention.

BRIEF DESCRIPTION OF THE FIGURES

FIG. 1 is an isometric view of a pair of eye glass frames showing typical temples.

FIG. 2 is an isometric view of a temple adapter in accordance with the principles of this invention.

FIG. 3 is a partial view of a pair of eye glass frames with the temple adapter of FIG. 2 mounted in place.

DETAILED DESCRIPTION OF THE PREFERRED EMBODIMENTS

Referring to FIG. 1 there is shown a pair of eye glasses 10 with a pair of temples 12 and 14 of conventional construction. As is understood in the art, temple 12 is a member extending from the frame 15 itself laying against the temple of the wearer and over an ear. This would inlude attachment 16 mounted on frame 15, hinge 18, and extended sidepiece 22.

In the event that temple 12 or 14 is damaged or broken, the eye glasses can either be replaced or taken to a shop for repair. The cost of repair is usually so great that it is most usual just to replace the whole eye glasses also at a fairly substantial cost.

The present invention makes it possible for the owner or user of the eye glasses to substitute two new temples on both sides, right and left, with a minimum of effort and skill, and at a great saving of expense.

Referring to FIGS. 2 and 3, there is shown a U-shaped adapter 24 which would be placed on frame 15 and glued in place by an epoxy or other suitable cement. Then the stationary member 26 of a replaceable temple 28 with a hinge 30 would be soldered on temple adapter 24 in the manner illustrated in FIG. 3. It is understood, of course, that member 26 could if desired be soldered in place first on adapter 24 which then could be mounted and glued in place. Adapter 24 is of sheet metal construction sufficiently thick to support the replacement temple and sufficiently thin to be bent to conform to the shape of the frame.

In the event the original temple is damaged or broken necessitating its replacement in accordance with this invention, the damaged or broken temple including attachment 16 would be completely removed. Then adapter 24 is fitted onto the place on frame 15 where it would be cemented in place. To facilitate its proper placement, the thickness of the metal employed in the construction of adapter 24 is sufficient to support the replacement temple yet thin enough to be bent or shaped to adjust to the particular cross section of the frame in the region where it is to be mounted. After the fitting is completed, then adapter 24 can either be cemented in place or the temple soldered on in the manner as described above and then cemented in place.

One of the advantages of this invention is that the adapter made in accordance with this invention is universal in its application, that is, it would be used with almost any frame in use, thereby making it possible to bring the cost of repair down to a level where its use should be highly attractive, and what is more important, within reach of more persons at economic levels where damaged or broken temples would be a financial burden.

While only certain preferred embodiments of this invention have been described, it is understood that many variations are possible without departing from the principles of this invention as defined in the claims which follow.

What is claimed is:

1. In combination with an eye glass frame, a replacement temple comprising temple adapter means for replacing an original connection of an original temple on said frame comprising a U-shaped member having an outside surface overlapping said frame and cemented thereto, a stationary member having an outside surface attached to the outside of said U-shaped member, a hinge having two sides, means on the outside of said stationary member for supporting one side of said hinge, and a replacement sidepiece connected to the other side of said hinge, said stationary member being soldered to the outside of said U-shaped member, and said U-shaped member being constructed of sheet metal sufficiently thick to support said replacement temple and sufficiently thin to permit fitting on and conforming to said frame and cemented thereto.

2. A method of repairing an eye glass frame in which a temple is damaged or broken comprising the steps of removing a damaged temple attachment from said frame, mounting on said frame over an original connection for an original frame a U-shaped temple adapter having an outside surface made of sheet metal contruction sufficiently thick to support a replacement temple and sufficiently thin to permit conforming said adapter to said frame, cementing said adapter to said frame, and soldering a hinge holder to the outside of said adapter, said holder supporting a hinge to which one end of said replacement temple is attached.

3. The method of claim2 in which said holder 1 is soldered on said adapter before the latter is mounted on said frame.

* * * * *